United States Patent
Linnartz

(10) Patent No.: US 6,252,972 B1
(45) Date of Patent: Jun. 26, 2001

(54) METHOD AND ARRANGEMENT FOR DETECTING A WATERMARK USING STATISTICAL CHARACTERISTICS OF THE INFORMATION SIGNAL IN WHICH THE WATERMARK IS EMBEDDED

(75) Inventor: Johan P. M. G. Linnartz, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/146,021

(22) Filed: Sep. 2, 1998

(30) Foreign Application Priority Data

Sep. 2, 1997 (EP) ................................... 97202699

(51) Int. Cl.⁷ ..................................... G06K 9/00
(52) U.S. Cl. ............................................. 382/100
(58) Field of Search ................... 382/100, 232; 380/210, 287, 54, 252

(56) References Cited

U.S. PATENT DOCUMENTS

| | | | |
|---|---|---|---|
| 5,664,018 | * 9/1997 | Leighton ................................ | 380/54 |
| 5,689,587 | * 11/1997 | Bender et al. ........................ | 382/232 |
| 5,825,892 | * 10/1998 | Braudaway et al. .................... | 380/51 |
| 5,933,798 | * 8/1999 | Linnartz ................................ | 702/191 |
| 6,131,161 | * 10/2000 | Linnartz ................................ | 713/176 |

OTHER PUBLICATIONS

Szepanski, "A Signal Theoretic Method for Creating Forgery-proof Documents for Automatic Verification," *Proc. 1979 Carnahan Conf. on Crime Countermeasures,* May 16–18, 1979, pp. 101–109.*

Boney et al., "Digital Watermarks for Audio Signals," . *Proc. 3rd IEEE int. Conf. on Multimedia Computing and Systems,* Jun. 17–23 1996, pp. 473–480.*

(List continued on next page.)

*Primary Examiner*—Andrew W. Johns
(74) *Attorney, Agent, or Firm*—Michael E. Belk

(57) ABSTRACT

Recently developed methods for copy protection rely on a watermark detector to judge whether multimedia content can be copied or not. In such copy protection schemes, a watermark detector examines the multimedia content and outputs a signal (D) indicating whether a watermark is present or not. Known watermark detectors determine a decision variable (y) indicating to which extent the watermark is present, for example, the amount of correlation between input signal and a reference copy of the watermark to be detected. The watermark is detected if the decision variable exceeds a predetermined threshold ($y_{thr}$)

In accordance with the invention, the threshold value ($y_{thr}$) is adaptively controlled in dependence upon statistical characteristics of the information signal and a desired probability of false alarms (watermark detected whereas the signal is not watermarked). In an embodiment, the watermark detector determines the standard deviation ($\sigma$) of the pixel values threshold level and calculates the threshold value in accordance with the relation $$P(falsealarm) = \mathrm{erfc}\left(\frac{y_{thr}}{\sigma}\right)$$

in which erfc is the error function and $\sigma$ is said standard deviation of the information signal values.

8 Claims, 2 Drawing Sheets

OTHER PUBLICATIONS

Podilchuk et al., "Digital Image Watermarking Using Visual Models," *Proc. IS&T/Spie Human Vision and Electronic Imaging II,* Feb. 9–14, 1997, pp. 100–111.*

Tao et al., "Adaptive Watermarking in the DCT Domain," *Proc. IEEE Int. Conf. on Acoustics, Speech, and Signal Processing,* Apr. 21–24, 1997, pp. 2985–2988.*

Voyatzis et al., "Embedding Robust Watermarks vy Chaotic Mixing," IEEE *Proc. 13th Int. conf. on Digital Signal Processing,* Jul. 2–4, 1997, pp. 213–216.*

Information Hiding Second International Workshop, IH'98, Apr. 1998, (Portland, Oregon, USA), Jean–Paul M.G. Linnartz et al., Springer–Verlag Berlin Heidelberg 1998, "Analysis of the Sensitivity Attack Against Electronic Watermarks in Images", p. 258–272.

* cited by examiner

METHOD AND ARRANGEMENT FOR DETECTING A WATERMARK USING STATISTICAL CHARACTERISTICS OF THE INFORMATION SIGNAL IN WHICH THE WATERMARK IS EMBEDDED

FIELD OF THE INVENTION

The invention relates to a method and arrangement for detecting a watermark embedded in an information signal.

BACKGROUND OF THE INVENTION

Watermarks are perceptually invisible messages embedded in information signals such as multimedia material, e.g. audio, still pictures, animations or video. Watermarks can be used to identify the copyright ownership of information. They allow a copyright owner to trace illegal copies of his material by inspecting whether his watermark is present in said copies.

Watermarks are embedded in an information signal by modifying data samples of the signal (e.g. audio samples of an audio signal, pixels of an image, transform coefficients of a transform-coded signal, etc.) such that the original is not perceptibly affected. Various methods of watermarking are known in the art. For example, pixels of an original image are slightly incremented or decremented in accordance with corresponding bits of a binary watermark pattern.

In order to detect whether an information signal has an embedded watermark, the signal is subjected to a statistical analysis. The statistical analysis yields a parameter, hereinafter referred to as "decision variable", which indicates to which extent the watermark is present in the signal. For example, if an image signal is watermarked by incrementing or decrementing its pixels in accordance with a watermark pattern, the decision variable may be the amount of correlation between the signal and an applied reference copy of the watermark. If an image is watermarked by modifying selected pixels, a prediction for said pixels is calculated from temporally or spatially adjacent pixels. The decision variable may then be the number of pixels being sufficiently different from their prediction.

Watermark detectors generate a binary output signal indicating "watermark found" or "no watermark found". That is achieved by comparing the decision variable with a predetermined threshold. If the value of the decision variable exceeds the threshold, the watermark is considered to be present in the signal. The threshold value is decisive for the performance of a watermark detector. If the threshold is too low, the detector will often make a false positive decision (false alarm). If the threshold is too high, the detector will often make a false negative decision (missed detection). In particular, pixel-domain watermarks are vulnerable to false decisions. Copy protection by means of watermark detection can only be applied in consumer products if the probabilities of false alarms is sufficiently small.

OBJECT AND SUMMARY OF THE INVENTION

It is an object of the invention to provide an improved method and arrangement for detecting a watermark.

To that end, the method in accordance with the invention is characterized in that it comprises means for generating the threshold value in dependence upon statistical characteristics of the information signal and a desired probability of erroneous detections. Herewith is achieved that the threshold value is adaptively controlled to obtain a desired false alarm rate.

Further advantageous embodiments of the invention are defined in the dependent claims.

DESCRIPTION OF EMBODIMENTS

The invention will now be described with reference to a watermark detector in which the decision variable indicating to which extent the watermark is present in the signal is the amount of correlation between the signal being analyzed and a reference copy of the watermark to be detected. However, the description should not be interpreted as restricting the invention to such an embodiment.

Figure 1:
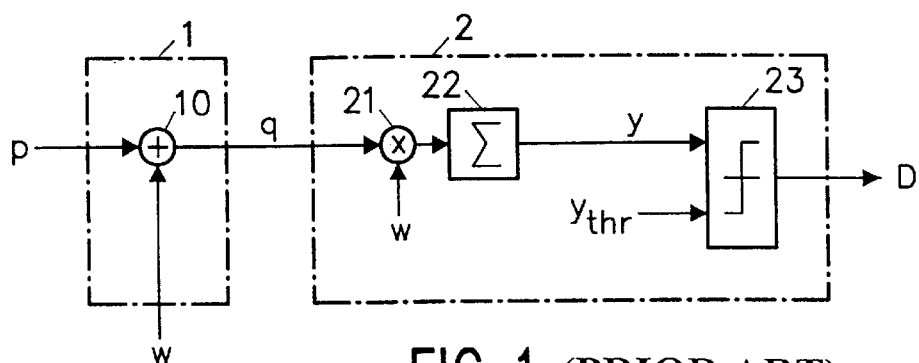
FIG. 1 shows a prior art system comprising a watermark embedder and a watermark detector.
Figure 2:
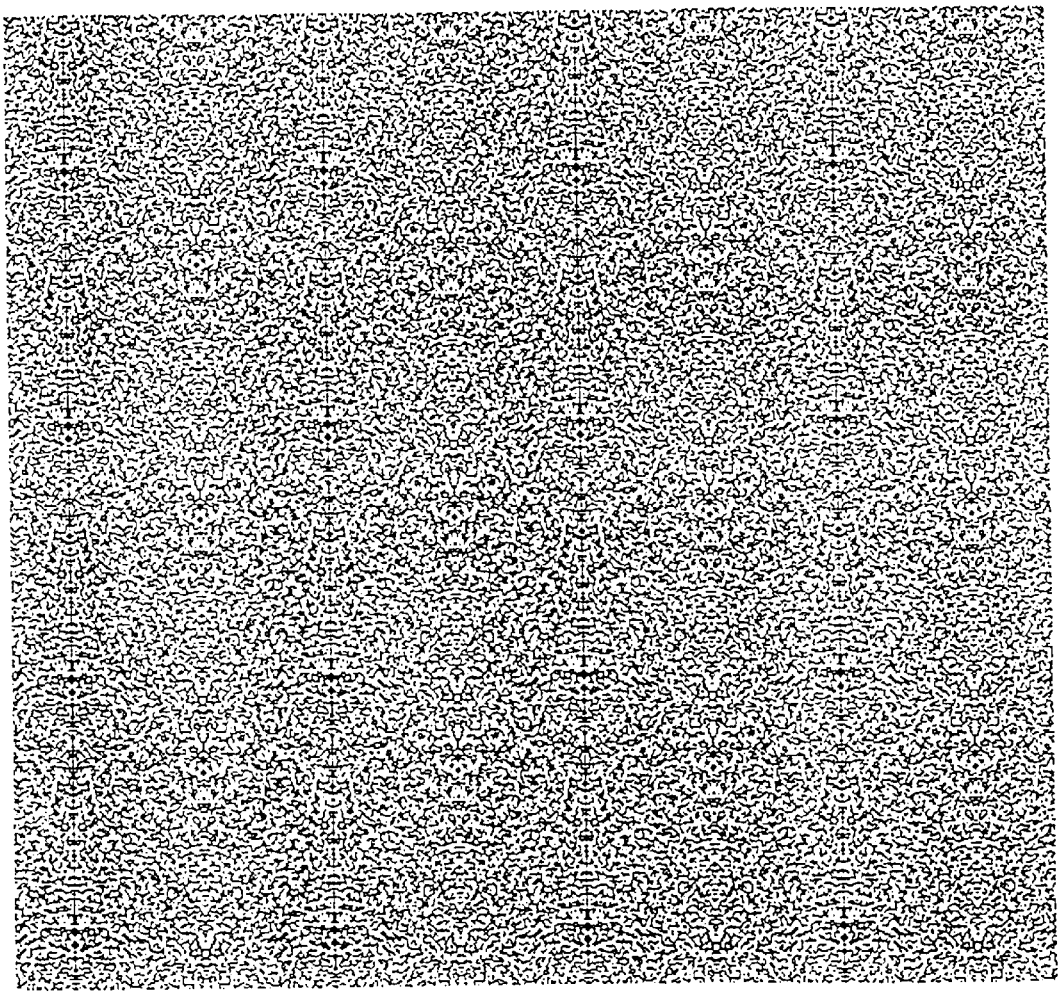
FIG. 2 shows a watermark pattern to illustrate the operation of the system which is shown in FIG. 1.

FIG. 1 shows a prior art system comprising a watermark embedder 1 and a watermark detector 2. The watermark embedder receives an original information signal p and a watermark signal w. The information signal p is assumed to be a digitized image having 8-bit luminance pixel values $p(n)$. The watermark w is assumed to be a specific binary pattern of values $w(n)=1$ or $w(n)=-1$. An example of such a watermark pattern is shown in FIG. 2 in which white and black dots represent the values $w(n)=-1$ and $w(n)=1$, respectively. The watermark embedder comprises an adding stage 10 which adds the watermark values $w(n)$ to the spatially corresponding pixels $p(n)$ of the input image. It will be appreciated that this does not affect the visual appearance of the image. The embedded watermark is thus perceptually invisible.

The information signal q is applied, after transmission or storage (not shown), to the watermark detector 2. The watermark detector comprises a multiplication stage 21 and a summing circuit 22 which collectively constitute a correlation circuit. The multiplication stage receives the information signal q and a reference copy of the watermark w the presence of which in the signal q is to be detected. The pixel values $q(n)$ of the received image and the corresponding values $w(n)$ of the reference watermark are individually multiplied and than summed up to obtain a decision variable y which represents the amount of correlation between input signal q and watermark w. In mathematical notation:

$$y = \sum_{n=1}^{N} w(n) \times q(n)$$

in which N is the total number of pixels.

Figure 3:
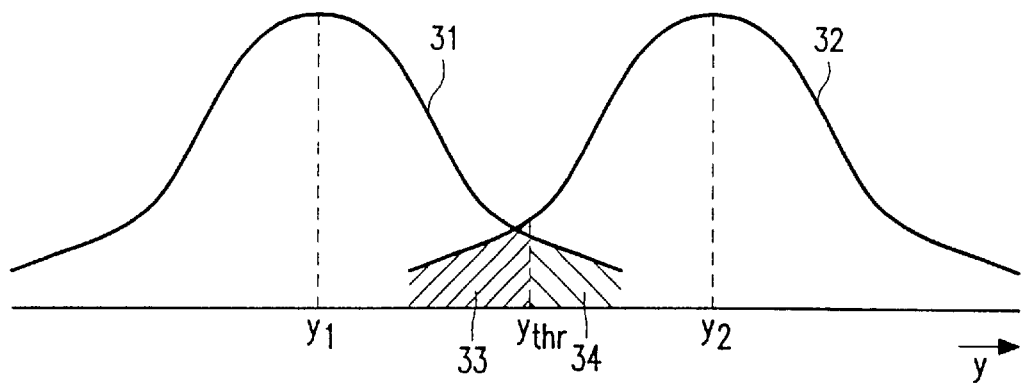
FIG. 3 shows probability density functions to illustrate the operation of the watermark detector in accordance with the invention.

The correlation value y is applied to a comparator 23 for comparison with a threshold value $y_{thr}$. The comparator produces an output D=1 (watermark found) for $y>y_{thr}$ and an output D=0 (no watermark found) for $y<y_{thr}$. The watermark pattern w and the threshold value $y_{thr}$ are carefully chosen to avoid that the detector makes too often a false decision. Such a false decision is made when the detector produces an output D=1 when the signal is not watermarked, and when the detector produces an output D=0 when the signal is watermarked. This is illustrated in FIG. 3 which shows the probability density function 31 of the correlation value y for a non-watermarked signal and the probability density function 32 of y for a watermarked signal. Their respective mean values are denoted $y_1$ and $y_2$, and $y_{thr}$ is the threshold value. It will be appreciated that the shaded area 34 represents the probability that a false alarm occurs (D=1 while the signal is not watermarked). Similarly, the shaded area 33 represents the probability that a negative false decision is made (D=0 although the signal is watermarked). The functions 31 and 32 are further apart from each other (i.e. the mean value $y_2$ is larger) as the energy of the embedded watermark is larger.

The invention provides setting of the threshold value $y_{thr}$ in dependence upon measurement of the above mentioned statistical characteristics of the information signal and a desired probability of false detections.

The inventors have found that the probability of occurrence of a false alarm can be represented by the equation:

$$P(falsealarm) = erfc\left(\frac{y_{thr}}{\sigma}\right) \quad \text{Eq. 1}$$

in which erfc is the so-called "error function" which is well-known in the field of mathematics, and $\sigma$ is the standard deviation of the signal values q(n) of the actually applied information signal.

Figure 4:
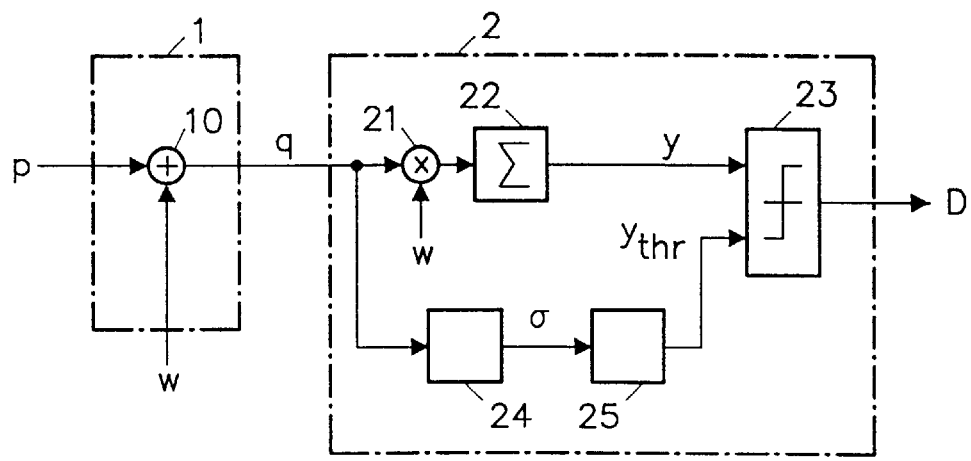
FIG. 4 shows an embodiment of a watermark detector in accordance with the invention.

An embodiment of a watermark detector in accordance with the invention exploits this relation between false alarm rate, threshold value and standard deviation. FIG. 4 shows such an embodiment. In the Figure, the same reference numerals are used for circuit elements that have already been shown in FIG. 1. The watermark detector further comprises means 24 for calculating the standard deviation $\sigma$ of the pixel values q(n) of the input image, and threshold generating means 25 for generating the threshold value $y_{thr}$ in accordance with a desired false alarm probability.

The threshold generating circuit 25 performs the inverse of the operation defined by Eq.1, i.e. it calculates the corresponding threshold value $y_{thr}$ for a desired false alarm probability. To that end, an embodiment of the circuit performs an iterative process in which the false alarm probability is iteratively calculated in accordance with Eq.1 for different threshold value candidates until P(false alarm) is sufficiently equal to a desired value. The threshold value $y_{thr}$ for which the desired probability is obtained is then applied to the comparator 23. The threshold value is thus adaptively controlled to obtain a desired false alarm rate.

The invention can be summarized as follows. Recently developed methods for copy protection rely on a watermark detector to judge whether multimedia content can be copied or not. In such copy protection schemes, a watermark detector examines the multimedia content and outputs a signal (D) indicating whether a watermark is present or not. Known watermark detectors determine a decision variable (y) indicating to which extent the watermark is present, for example, the amount of correlation between input signal and a reference copy of the watermark to be detected. The watermark is detected if the decision variable exceeds a predetermined threshold ($y_{thr}$).

In accordance with the invention, the threshold value ($y_{thr}$) is adaptively controlled in dependence upon statistical characteristics of the information signal and a desired probability of false alarms (watermark detected whereas the signal is not watermarked). In an embodiment, the watermark detector determines the standard deviation ($\sigma$) of the pixel values threshold level and calculates the threshold value in accordance with the relation $$P(falsealarm) = erfc\left(\frac{y_{thr}}{\sigma}\right)$$

in which erfc is the error function and $\sigma$ is said standard deviation of the information signal values.

What is claimed is:

1. An arrangement comprising:
   means for receiving a watermark embedded in an information signal;
   means for determining a decision variable indicating the extent to which the watermark is present in the signal;
   means for generating an output signal indicating detection of the watermark if the decision variable exceeds a predetermined threshold; and
   means for generating the threshold value depending on statistical characteristics of the information signal and a desired probability of erroneous detections.

2. The arrangement of claim 1, wherein the threshold value generating means includes means for calculating the standard deviation or variance of information signal values to obtain the statistical characteristics of the information signal.

3. The arrangement of claim 2, wherein the threshold value generating means further includes means for calculating the threshold value in accordance with the relation $$P(falsealarm) = erfc\left(\frac{y_{thr}}{\sigma}\right)$$

in which P(falsealarm) is a desired probability of a false alarm, $y_{the}$ is the threshold value, erfc is the error function, and $\sigma$ is the standard deviation of the information signal values.

4. The arrangement of claim 1, wherein:
   the threshold value generating means includes means for calculating the standard deviation or variance of information signal values to obtain the statistical characteristics of the information signal; and
   the generating means includes means for calculating the threshold value in accordance with the relation $$P(falsealarm) = erfc\left(\frac{y_{thr}}{\sigma}\right)$$

in which P(falsealarm) is a desired probability of a false alarm. $y_{the}$ is the threshold value, erfc is the error function, and $\sigma$ is the standard deviation of the information signal values.

5. A method comprising the steps of:
   providing a watermark embedded in an information signal;
   determining a decision variable indicating the extent to which the watermark is present in the signal;
   generating an output signal indicating detection of the watermark if the decision variable exceeds a predetermined threshold; and
   controlling the threshold value depending on statistical characteristics of the information signal and a desired probability of erroneous detections.

6. The method of claim 5, wherein:
   the generating includes calculating the standard deviation or variance of information signal values to obtain the statistical characteristics of the information signal; and the generating includes calculating the threshold value in accordance with the relation $$P(falsealarm) = \mathrm{erfc}\left(\frac{y_{thr}}{\sigma}\right)$$

in which P(falsealarm) is a desired probability of a false alarm, $y_{the}$ is the threshold value, erfc is the error function and $\sigma$ is the standard deviation of the information signal values.

7. Multimedia playing and/or recording apparatus, comprising:
- means for receiving a watermark embedded in an information signal;
- means for determining a decision variable indicating the extent to which the watermark is present in the signal;
- means for generating an output signal indicating detection of the watermark if the decision variable exceeds a predetermined threshold; and
- means for generating the threshold value depending on statistical characteristics of the information signal and a desired probability of erroneous detections.

8. The apparatus of claim 7, wherein:
- the threshold value generating means includes means for calculating the standard deviation or variance of information signal values to obtain the statistical characteristics of the information signal; and
- the threshold value generating means includes means for calculating the threshold value in accordance with the relation $$P(falsealarm) = \mathrm{erfc}\left(\frac{y_{thr}}{\sigma}\right)$$

in which P(falsealarm) is a desired probability of a false alarm, $y_{the}$ is the threshold value, erfc is the error function, and $\sigma$ is the standard deviation of the information signal values.

* * * * *